US011135925B2

(12) United States Patent
Moriya et al.

(10) Patent No.: US 11,135,925 B2
(45) Date of Patent: Oct. 5, 2021

(54) VEHICLE

(71) Applicant: SUBARU CORPORATION, Tokyo (JP)

(72) Inventors: Fumiyuki Moriya, Tokyo (JP); Yuta Totsuka, Tokyo (JP); Hidehiro Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/689,935

(22) Filed: Nov. 20, 2019

(65) Prior Publication Data
US 2020/0247248 A1 Aug. 6, 2020

(30) Foreign Application Priority Data

Feb. 5, 2019 (JP) .............................. JP2019-018862

(51) Int. Cl.
| | |
|---|---|
| *B60L 53/122* | (2019.01) |
| *H02J 7/02* | (2016.01) |
| *B60L 50/60* | (2019.01) |
| *H02J 50/90* | (2016.01) |
| *H02J 50/80* | (2016.01) |
| *H02J 50/10* | (2016.01) |
| *H02J 50/12* | (2016.01) |
| *H02J 50/60* | (2016.01) |

(52) U.S. Cl.
CPC ............. *B60L 53/122* (2019.02); *B60L 50/66* (2019.02); *H02J 7/025* (2013.01); *H02J 50/10* (2016.02); *H02J 50/12* (2016.02); *H02J 50/60* (2016.02); *H02J 50/80* (2016.02); *H02J 50/90* (2016.02)

(58) Field of Classification Search
CPC ........ B60L 53/122; B60L 53/10; B60L 53/12; B60L 50/66; B60L 53/36; H02J 50/80; H02J 50/90; H02J 50/10; H02J 7/025; H02J 50/12; H02J 50/70; H02J 50/40; H02J 50/60
See application file for complete search history.

(56) References Cited

U.S. PATENT DOCUMENTS

| | | | |
|---|---|---|---|
| 2012/0306439 A1 | 12/2012 | Ichikawa et al. | |
| 2014/0077760 A1* | 3/2014 | Ichikawa ................ | H02J 50/12 320/108 |
| 2018/0375390 A1* | 12/2018 | Sieber ..................... | B60L 53/66 |

FOREIGN PATENT DOCUMENTS

WO WO 2010/131348 A1 11/2010

* cited by examiner

*Primary Examiner* — John W Poos
*Assistant Examiner* — Alex W Lam
(74) *Attorney, Agent, or Firm* — McGinn IP Law Group, PLLC

(57) ABSTRACT

A vehicle includes a battery, an electric power acquirer, a power supply unit, first and second relays, a controller, a vehicle controller, and a first determination unit. The first determination unit makes a determination, at a system start-up, as to whether or not a power receiving coil of the electric power acquirer is in position to be available for electric power reception from a power transmitting coil of ground facilities. The controller changes, at the system start-up, a switching procedure of the first relay and the second relay on the basis of a result of the determination of the first determination unit.

15 Claims, 2 Drawing Sheets

VEHICLE

CROSS-REFERENCE TO RELATED APPLICATIONS

This application claims priority from Japanese Patent Application No. 2019-018862 filed on Feb. 5, 2019, the entire contents of which are hereby incorporated by reference.

BACKGROUND

The technology relates to a vehicle including a battery and an electric power acquirer that acquires electric power for battery charging from outside.

Vehicles such as electric vehicles (EV) and plug-in hybrid electric vehicles (PHEV) are equipped with a high-voltage battery. The high-voltage battery has large capacity and accumulates electric power for travel of a vehicle. Sometimes the high-voltage battery is used as a power supply for on-vehicle devices such as an air conditioner and a navigation system. Further, in recent years, utilities have been put into practical use. The utilities are provided for AC power supply from a power receptacle attached inside or outside a vehicle body. The high-voltage battery has also been used as a power supply of the utilities.

Such vehicles are able to acquire electric power from an external power supply and to charge the high-voltage battery. Methods of charging may include non-contact charging and wired charging. The non-contact charging includes acquiring electric power non-contact from a power transmitting coil of ground facilities. The wired charging includes acquiring electric power by wire through a charging connector.

Generally, in vehicles equipped with a high-voltage battery, the high-voltage battery and a power supply line of a system are disconnectable through a system main relay, in order to hinder a voltage of the high-voltage battery from being unduly outputted to the power supply line. Moreover, in vehicles that is able to charge a high-voltage battery from an external power supply, an electric power acquirer and a power supply line are disconnectable through a charging relay, in order to hinder a voltage of the high-voltage battery from being unnecessarily outputted to the electric power acquirer. International Publication No. 2010/131348 discloses a vehicle including a system main relay and a relay. The system main relay couples an accumulator device to a power line. The relay couples a power receiving coil for non-contact charging to a charger.

SUMMARY

An aspect of the technology provides a vehicle including a battery, an electric power acquirer, a power supply unit, a first relay, a second relay, a controller, a vehicle controller, and a first determination unit. The battery is configured to accumulate electric power for travel of the vehicle. The electric power acquirer includes a power receiving coil and is configured to acquire electric power non-contact through the power receiving coil. The power supply unit is able to provide a power supply from the battery to a device other than a traveling motor. The first relay is configured to connect the battery to a power supply line or to disconnect the battery from the power supply line. The second relay is configured to connect the electric power acquirer to the power supply line or to disconnect the electric power acquirer from the power supply line. The controller is configured to perform a switching control of the first relay and the second relay. The vehicle controller is configured to perform a travel control of the vehicle. The first determination unit is configured to make a determination, at a system start-up, as to whether or not the power receiving coil is in position to be available for electric power reception from a power transmitting coil of ground facilities. The controller is configured to change, at the system start-up, a switching procedure of the first relay and the second relay on the basis of a result of the determination of the first determination unit.

An aspect of the technology provides a vehicle including a battery, an electric power acquirer, a power supply unit, a first relay, a second relay, and circuitry. The battery is configured to accumulate electric power for travel of the vehicle. The electric power acquirer includes a power receiving coil and is configured to acquire electric power non-contact through the power receiving coil. The power supply unit is able to provide a power supply from the battery to a device other than a traveling motor. The first relay is configured to connect the battery to a power supply line or to disconnect the battery from the power supply line. The second relay is configured to connect the electric power acquirer to the power supply line or to disconnect the electric power acquirer from the power supply line. The circuitry is configured to perform a switching control of the first relay and the second relay. The circuitry is configured to perform a travel control of the vehicle. The circuitry is configured to make a determination, at a system start-up, as to whether or not the power receiving coil is in position to be available for electric power reception from a power transmitting coil of ground facilities. The circuitry is configured to change, at the system start-up, a switching procedure of the first relay and the second relay on a basis of a result of the determination.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
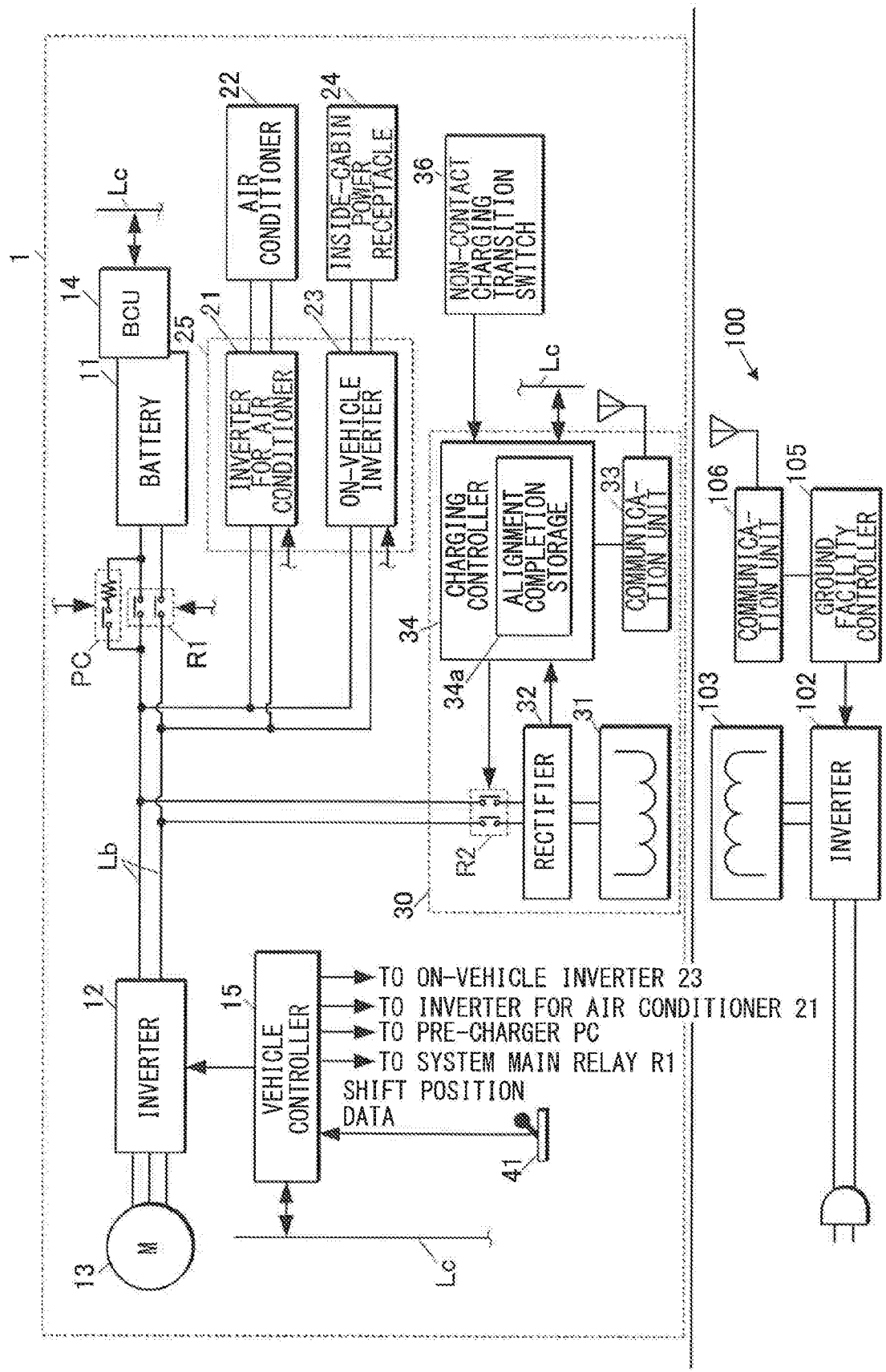
FIG. 1 is a block diagram illustrating a vehicle according to an embodiment of the technology.

In a vehicle including a high-voltage battery, a relay switching control is carried out in order to hinder an excessive current such as a rush current from flowing through a relay. For example, at a start of charging with a charging relay switched to a connected state, a system main relay is once brought to a disconnected state, causing separation of the high-voltage battery from a power supply line. Thereafter, the charging relay is switched to the connected state. Then, the system main relay is switched again to a connected state. To the system main relay, attached is a protection mechanism. The protection mechanism allows a voltage between both ends of the system main relay to change mildly. Accordingly, the procedure described above makes it possible to couple the high-voltage battery and an electric power acquirer through the power supply line, without letting an excessive current flow through both the charging relay and the system main relay.

In a case where the high-voltage battery is charged while an on-vehicle device or an electric device coupled to a power receptacle of utilities is in operation, however, the relay switching control as described above may cause possibility of temporary interruption of power supply of the on-vehicle device or the electric device.

It is desirable to provide a vehicle that makes it possible to suppress impairment of convenience in using an electric device in a case with the use of the electric device and with non-contact charging of a battery after a system start-up before traveling.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

FIG. 1 is a block diagram illustrating a vehicle according to an embodiment of the technology.

A vehicle 1 according to an embodiment of the technology may be, for example, an electric vehicle (EV) and a hybrid electric vehicle (HEV). The vehicle 1 may include a battery 11, a traveling motor 13, an inverter 12, and a battery control unit (BCU) 14. The battery 11 may accumulate electric power for travel of the vehicle 1. The traveling motor 13 may drive a driving wheel. The inverter 12 may convert electric power between the battery 11 and the traveling motor 13. The BCU 14 may manage a state of the battery 11. The battery 11 may output a high voltage that drives the traveling motor 13 and may be referred to as a high-voltage battery. The battery 11 may include, for example, a secondary battery such as a lithium-ion storage battery or a nickel hydrogen storage battery.

The vehicle 1 may further include a system main relay R1, a pre-charger PC, and a power supply line Lb. The battery 11 may be coupled to the power supply line Lb through the system main relay R1 and the pre-charger PC. The pre-charger PC may bring voltages at both ends of the system main relay R1 slowly closer to each other, with the system main relay R1 in a disconnected state. To connect the battery 11 to the power supply line Lb, first, the pre-charger PC may be switched to a connected state, thereby reducing a potential difference between both ends of the system main relay R1. Thereafter, the system main relay R1 may be switched to a connected state and the pre-charger PC may be switched to a disconnected state. This makes it possible to switch the system main relay R1 from the disconnected state to the connected state, without an excessive current flowing through the system main relay R1. Hereinafter, description that the system main relay R1 is switched to the connected state is assumed to include the forgoing switching operation of the pre-charger PC.

In one embodiment of the technology, the system main relay R1 may serve as a "first relay".

The vehicle 1 may further include a vehicle controller 15. The vehicle controller 15 may perform a travel control of the vehicle 1 and a control of each part of the vehicle 1. The vehicle controller 15 may include a single electronic control unit (ECU), or alternatively, the vehicle controller 15 may include a plurality of ECUs that operate in cooperation with one another. For example, the vehicle controller 15 may drive the inverter 12 to cause powering operation or regenerative operation of the traveling motor 13, in accordance with an operation of a driving operation unit, e.g., an undepicted pedal and a shift lever 41. This leads to the travel of the vehicle 1 in accordance with a driving operation. In addition, the vehicle controller 15 may perform a start-up control of a power supply unit 25 and a switching control of the system main relay R1 and the pre-charger PC.

In one embodiment of the technology, the vehicle controller 15 may serve as a "second determination unit" and a "vehicle controller".

The vehicle 1 may further include the power supply unit 25. The power supply unit 25 is configured to supply a power supply voltage to an electric device other than the traveling motor 13, using electric power of the battery 11. The power supply unit 25 may include, for example, an inverter for air conditioner 21, an on-vehicle inverter 23, and an undepicted heater switch. The inverter for air conditioner 21 may convert electric power of the battery 11 and send a driving current to the air conditioner 22, that is, for example, to a compressor. The on-vehicle inverter 23 may convert electric power of the battery 11 into an AC power supply voltage, and output the AC power supply voltage to an inside-cabin power receptacle 24. An occupant of the vehicle 1 may drive the on-vehicle inverter 23, and thereby be able to couple, for example, a home electric appliance to the inside-cabin power receptacle 24 and use the home electric appliance. To the heater switch, coupled may be a positive temperature coefficient (PTC) heater as a load. The PTC heater may heat air conditioning coolant or the battery 11. Turning on the heater switch causes electric power supply to the PTC heater.

Instead of the inside-cabin power receptacle 24, or in addition to the inside-cabin power receptacle 24, a vehicle exterior power receptacle or an indoor power receptacle may be coupled to the on-vehicle inverter 23. The vehicle exterior power receptacle or the indoor power receptacle makes it possible to use an electric appliance near the vehicle 1, or outside a cabin of the vehicle 1. In another alternative, instead of the on-vehicle inverter 23, the power supply unit 25 may include a connector and a relay to which an external inverter may be coupled. Coupling the external inverter to the connector and turning the relay on causes electric power supply from the power supply line Lb to the inverter in accordance with a control by the vehicle controller 15, causing an AC power supply voltage to be outputted from the external inverter to the vehicle exterior power receptacle. Alternatively, the AC power supply voltage may be outputted from the external inverter to a household power receptacle. A configuration of supplying the AC power supply voltage from the vehicle 1 to vehicle exterior may be V2L (Vehicle to Load), and a configuration of supplying the AC power supply voltage from the vehicle 1 to indoor may be V2H (Vehicle to Home). With such a configuration, it is possible for a user of the vehicle 1 to use an electric appliance near the vehicle 1 or at home, using electric power supplied from the vehicle 1.

The vehicle 1 may further include a non-contact charging mechanism 30. The non-contact charging mechanism 30 may acquire electric power non-contact from ground facilities 100. The non-contact charging mechanism 30 may include a power receiving coil 31, a rectifier 32, a communication unit 33, a charging controller 34, and a charging relay R2. The communication unit 33 may perform wireless communication. The power receiving coil 31 is able to receive electric power from a power transmitting coil 103 of the ground facilities 100 by electromagnetic coupling or electromagnetic resonance in an opposed state to the power transmitting coil 103. The rectifier 32 may rectify an AC current outputted from the power receiving coil 31 and send the rectified AC current toward the power supply line Lb. The charging relay R2 may switch the rectifier 32 and the power supply line Lb between a connected state and a disconnected state.

In one embodiment of the technology, the charging relay R2 may serve as a "second relay". In one embodiment of the technology, the power receiving coil 31 and the rectifier 32 may serve as an "electric power acquirer". In one embodiment of the technology, the charging controller 34 may serve as a "first determination unit" and a "controller".

The charging controller 34 may communicate with the ground facilities 100 through the communication unit 33, and receive voltage data from the rectifier 32, to perform a control of non-contact charging. The control of the non-contact charging may include a switching control of the charging relay R2. The charging controller 34 may perform communication through a communication line Lc and cooperate with the vehicle controller 15 and the BCU 14. That is, the charging controller 34 is able to perform the switching control of the system main relay R1 through the vehicle controller 15. Moreover, the charging controller 34 is able to acquire data regarding various driving operations by the occupant and state data of the battery 11, through the vehicle controller 15 and the BCU 14. The data regarding the various driving operations may include position data of the shift lever 41, e.g., a parking mode, a drive mode, and a reverse mode. The state data of the battery 11 may include a state of charge (SOC).

The charging controller 34 may include an ECU including a central processing unit (CPU), a storage, and a random access memory (RAM). The storage may hold control programs to be executed by the CPU and control data. The RAM is provided for expansion of data by the CPU. The storage may include an alignment completion storage 34a. The alignment completion storage 34a may hold data regarding completion of alignment of the power receiving coil 31 in transition processing to the non-contact charging.

The vehicle 1 may further include a non-contact charging transition switch 36. The non-contact charging transition switch 36 may be provided on, for example, a dashboard. The occupant of the vehicle 1 may operate the non-contact charging transition switch 36, to give the charging controller 34 a command to make a transition to the non-contact charging.

It is to be noted that because the vehicle controller 15 and the charging controller 34 cooperate by the communication through the communication line Lc, part of processing of the vehicle controller 15 illustrated in the example of FIG. 1, e.g., the switching control of the system main relay R1, may be performed by the charging controller 34. Conversely, part of processing of the charging controller 34 illustrated in the example of FIG. 1, e.g., signal input from the non-contact charging transition switch 36 and the switching control of the charging relay R2, may be performed by the vehicle controller 15. Moreover, the vehicle controller 15 and the charging controller 34 do not have to be separate from each other, but may be unified as a unitary controller.

The ground facilities 100 may include the power transmitting coil 103, an inverter 102, a communication unit 106, and a ground facility controller 105. The power transmitting coil 103 may transmit electric power in a non-contact manner. The inverter 102 may convert electric power from an external power supply and output converted electric power to the power transmitting coil 103. The communication unit 106 is able to communicate with the charging controller 34 of the vehicle 1. The ground facility controller 105 may perform a drive control of the inverter 102. The charging controller 34 of the vehicle 1 is able to send a request for excitation of the power transmitting coil 103 to the ground facility controller 105 by wireless communication of the communication units 33 and 106.

<Non-Contact Charging Processing>

Described next is non-contact charging processing of charging the battery 11 using the non-contact charging mechanism 30. The non-contact charging processing may be started with an operation of the non-contact charging transition switch 36 when the vehicle 1 is in the vicinity of the ground facilities 100. At the start of the non-contact charging processing, first, the charging controller 34 may execute the transition processing to the non-contact charging. The transition processing to the non-contact charging may include alignment processing of the power receiving coil 31 and a relay switching control of the charging relay R2 and the system main relay R1.

In the alignment processing of the power receiving coil 31, the charging controller 34 may request of the ground facilities 100 low excitation for the alignment, to allow the power transmitting coil 103 to be excited. While monitoring induced electromotive force generated in the power receiving coil 31 on the basis of the excitation, the charging controller 34 may induce a driver to move the vehicle 1. With such a control, the power receiving coil 31 is aligned at an opposed position to the power transmitting coil 103, and the vehicle 1 stops. During the alignment processing, the system main relay R1 may be in the connected state, and the charging relay R2 may be in the disconnected state.

Thereafter, in the relay switching control, the charging controller 34 may once switch the system main relay R1 to the disconnected state, and thereafter, switch the charging relay R2 to the connected state. Thereafter, the charging controller 34 may switch the system main relay R1 again to the connected state. With such a relay switching control, the rectifier 32 and the battery 11 are coupled through the power supply line Lb, while suppressing an excessive current such as a rush current flowing through the charging relay R2.

After completion of the transition processing to the non-contact charging, i.e., the alignment processing of the power receiving coil 31 and the relay switching control, the charging controller 34 may request of the ground facilities 100 electric power transmission for the charging. Thereupon, the power transmitting coil 103 may be excited for the electric power transmission, causing the electric power transmission from the power transmitting coil 103 to the power receiving coil 31. Electric power received by the power receiving coil 31 may be rectified by the rectifier 32, and the resultant electric power may be transmitted to the battery 11 through the power line Lb. During the electric power transmission, the charging controller 34 may monitor, for example, charging time, the state of charge of the battery 11, and presence or absence of the electric power transmission. In a case with a lapse of predetermined charging time, or in a case where the battery 11 becomes fully charged, the charging controller 34 may request of the ground facilities 100 a stop of the excitation of the power transmitting coil 103. Thus, the charging of the battery 11 is brought to an end. At the end of the charging, the charging controller 34 may switch the charging relay R2 to the disconnected state, allowing the vehicle 1 to be able to travel.

<System Start-Up Processing>

With a system of the vehicle 1 in a halt state, a start-up operation by, for example, the occupant of the vehicle 1 brings the system of the vehicle 1 to a system start-up. Non-limiting examples of the start-up operation may include turning on a power button. The halt state of the system means a state that the system main relay R1 is disconnected and the vehicle controller 15 is in standby operation. The system start-up means that the system main relay R1 is switched to the connected state and the vehicle controller 15 starts up, causing the vehicle 1 to make a transition to a state that the vehicle 1 is able to travel.

After the system start-up of the vehicle 1, the driver may allow the vehicle 1 to travel, or alternatively, the driver may perform the charging of the battery 11 before the travel. However, the charging of the battery 11 before the travel may be limited to a case where the vehicle 1 is located over the ground facilities 100 and the power receiving coil 31 has been aligned in position. Moreover, at the system start-up of the vehicle 1, there are cases where the occupant of the vehicle 1 is using some electric device with the use of the power supply unit 25. During the use of the power supply unit 25, switching the system main relay R1 once to the disconnected state to start the charging of the battery 11 would cause interruption of the electric power supply from the power supply unit 25. This would contribute to impairment of convenience of the power supply unit 25.

Figure 2:
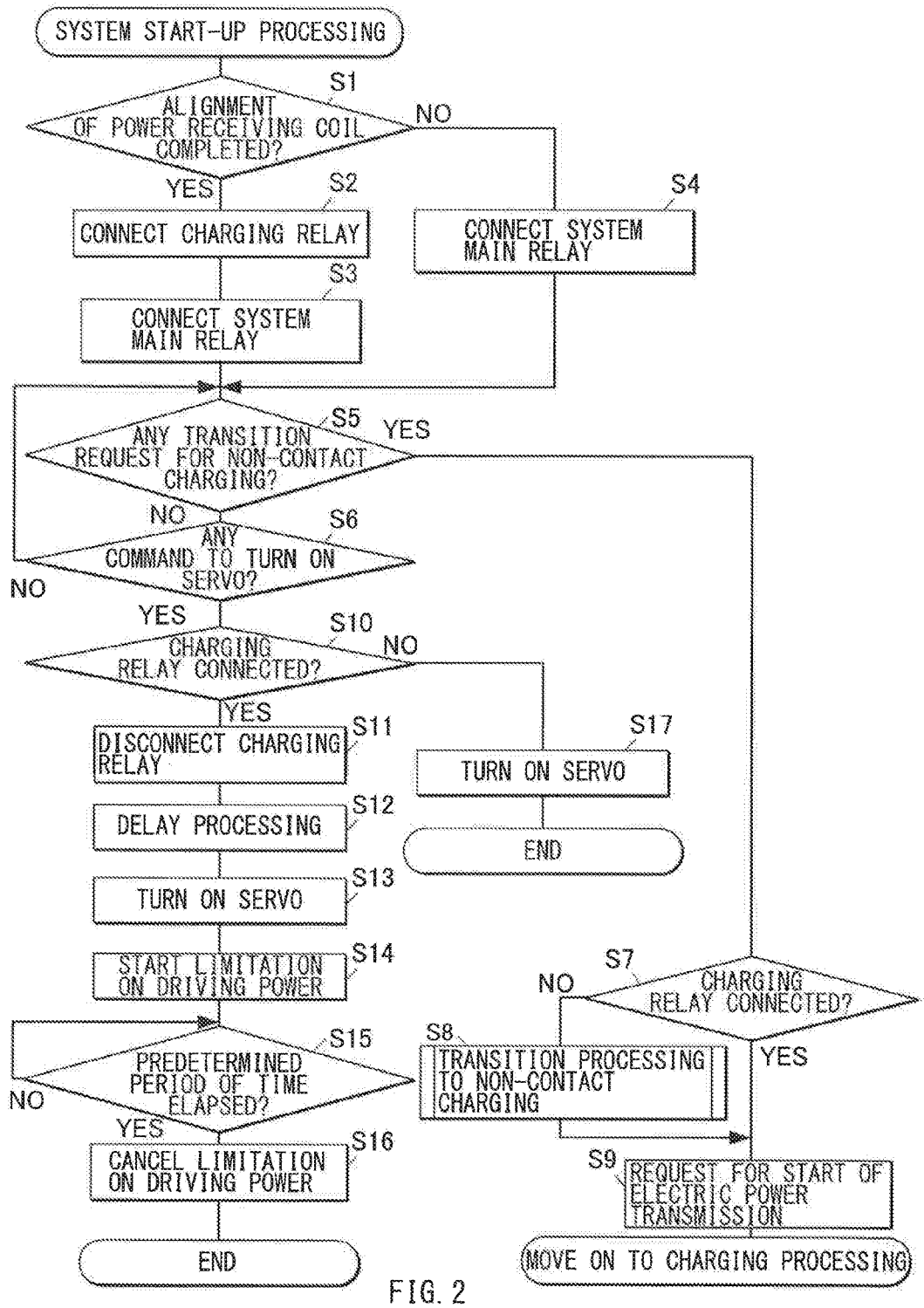
FIG. 2 is a flowchart illustrating a procedure of system start-up processing to be executed by a charging controller and a vehicle controller in cooperation.

FIG. 2 is a flowchart illustrating system start-up processing to be executed by the charging controller 34 and the vehicle controller 15 in cooperation.

The system start-up processing may be started with the start-up operation, and thereupon, the charging controller 34 may, first, determine whether or not the power receiving coil 31 is in position to be available for the electric power transmission from the power transmitting coil 103 (step S1). The charging controller 34 may determine that the power receiving coil 31 is in position to be available for the electric power transmission from the power transmitting coil 103, in a case where the vehicle 1 has not been on travel since the previous completion of the alignment processing. The determination may be made, for example, on the basis of history data regarding the alignment processing on previous occasions and on the basis of history data regarding the travel of the vehicle 1. The history data regarding the alignment processing on the previous occasions may be held by the alignment completion storage 34a. The history data regarding the travel of the vehicle 1 may be held by the vehicle controller 15.

In a case where the power receiving coil 31 is in position to be available for the electric power transmission (step S1: YES), the charging controller 34 may allow the system main relay R1 to be switched to the connected state through the vehicle controller 15 (step S4). Thereafter, the charging controller 34 may allow the processing to proceed to step S5.

In a case where the power receiving coil 31 is out of position to be available for the electric power transmission (step S1: NO), the charging controller 34 may, first, switch the charging relay R2 to the connected state (step S2), and thereafter, switch the system main relay R1 to the connected state through the vehicle controller 15 (step S3). At timing of the switching of the charging relay R2 in step S2, the power supply line Lb and the battery 11 are isolated. This keeps any excessive current such as a rush current from flowing through the charging relay R2. Thus, the charging controller 34 may allow the processing to proceed to step S5.

Switching the system main relay R1 to the connected state in step S3 or S4 makes it possible for the occupant of the vehicle 1 to start up the power supply unit 25 and drive the electric device.

As the processing proceeds, the charging controller 34 and the vehicle controller 15 may repetitively execute a determination as to presence or absence of a request for the transition to the non-contact charging (step S5) and a determination as to presence or absence of a command to turn on a servo (step S6), until any one of them comes to a positive determination (step S5 or S6: YES). In this loop processing, in a case where the non-contact charging transition switch 36 is operated and the request for the transition to the non-contact charging is made (step S5: YES), the charging controller 34 may allow the processing to proceed to step S7. In a case where the command to turn on the servo is given by the occupant of the vehicle 1 (step S6: YES), the vehicle controller 15 may allow the processing to proceed to step S10. To turn on the servo means that an operation of the shift lever 41 causes a shift position to be switched to the drive mode or the reverse mode, and the inverter 12 is turned on to bring the vehicle 1 to a traveling mode.

In the loop processing of steps S5 and S6, on the request for the transition to the non-contact charging (step S5: YES), the charging controller 34 may, first, determine whether or not the charging relay R2 is in the connected state (step S7). In a case where the charging relay R2 is in the connected state (step S7: YES), it follows that the power receiving coil 31 has been aligned in position. Thus, the charging controller 34 may request of the ground facilities 100 the start of the electric power transmission for the charging (step S9), without newly performing the alignment processing of the power receiving coil 31 and the relay switching control. In a case where the charging relay R2 is not in the connected state (step S7: NO), it follows that the power receiving coil 31 has not been aligned in position. Thus, the charging controller 34 may execute the normal transition processing to the non-contact charging (step S8). The processing of step S8 may correspond to the transition processing to the non-contact charging inclusive of the alignment processing of the power receiving coil 31 and the relay switching control. At the completion of the transition processing to the non-contact charging, the charging controller 34 may request of the ground facilities 100 the start of the electric power transmission for the charging (step S9). On the request of step S9, the electric power transmission from the power transmission coil 103 is started. Thereupon, the charging controller 34 may allow the processing to proceed to charging processing.

Let us examine a case where the driver stops the vehicle 1 at the completion of the alignment of the power receiving coil 31, and thereafter, starts up the vehicle 1 to use the power supply unit 25, and performs the non-contact charging with a slight decrease in the state of charge of the battery 11 to restore the state of charge of the battery 11. On the request for the non-contact charging, with the charging relay R2 disconnected, it would be necessary to once disconnect the system main relay R1, in order to switch the charging relay R2 to the connected state. In this case, the electric power supply from the power supply unit 25 would be interrupted, which would contribute to impaired convenience of the power supply unit 25 in a case with the use of an electric device interruption of electric power supply to which causes inconvenience. In contrast, in this embodiment, the charging relay R2 is kept in the connected state in the forgoing case, and the non-contact charging is started without once disconnecting the system main relay R1. Accordingly, there is no interruption of the electric power supply from the power supply unit 25. Hence, it is possible to suppress the impairment of the convenience of the power supply unit 25.

In the loop processing of steps S5 and S6, on the command to turn on the servo (step S6: YES), the vehicle controller 15 may make an inquiry of the charging controller 34 to determine whether or not the charging relay R2 is in the connected state (step S10). In a case with the charging relay R2 in the connected state (step S10: YES), the vehicle controller 15 may switch the charging relay R2 to the disconnected state through the charging controller 34 (step S11). Furthermore, the vehicle controller 15 may perform delay processing (step S12) for a period in which discharging of the power receiving coil 31 and the rectifier 32 progresses, e.g., 5 seconds. Thereafter, the vehicle controller 15 may start up the inverter 12 (step S13). In this way, the vehicle 1 becomes able to travel.

Furthermore, the vehicle controller 15 may perform processing of putting limitation on driving power of the vehicle 1 until a lapse of a predetermined period in which the discharging of the power receiving coil 31 and the rectifier 32 is completed thoroughly (steps S14 to S16). The limitation on the driving power may be made by setting upper limit driving power and by hindering the vehicle controller 15 from outputting a torque command for torque equal to or greater than the upper limit driving power, whatever driving operation is made. After the lapse of the predetermined period, the limitation on the driving power may be cancelled (step S16). Thus, the system start-up processing may be terminated.

In a case where the charging relay R2 is not in the connected state (step S10: NO), the vehicle controller 15 may start up the inverter 12 (step S17) and terminate the system start-up processing.

With such system start-up processing, it is possible to perform the relay switching control in accordance with states at the system start-up, and to perform, afterwards, processing to allow the vehicle 1 to travel or the charging processing of the battery 11 on the request by the driver or the occupant.

As described, according to the vehicle 1 of this embodiment, at the system start-up, the charging controller 34 makes the determination as to whether or not the power receiving coil 31 is in position to be available for the electric power reception from the ground facilities 100 (step S1 in FIG. 2). On the basis of the result of the determination, the charging controller 34 changes the switching procedure of the system main relay R1 and the charging relay R2 (steps S2 and S3, or step S4). The states of use of the power supply unit 25 and the non-contact charging mechanism 30 assumed after the system start-up vary with whether or not the power receiving coil 31 has been aligned in position at the system start-up. Accordingly, changing the relay switching procedure on the basis of the forgoing result of the determination makes it possible to provide the switching of the system main relay R1 and the charging relay R2 suitable for each of the various states of use. With such switching, it is possible to suppress the impairment of the convenience, e.g., the interruption of the electric power supply to the power supply unit 25, at the start of the non-contact charging during the use of the power supply unit 25 after the system start-up before the travel.

In one specific but non-limiting example, determining that the power receiving coil 31 has been aligned in position at the system start-up, the charging controller 34 may switch the charging relay R2 to the connected state, and thereafter, switch the system main relay R1 to the connected state. Meanwhile, determining that the power receiving coil 31 has not been aligned in position, the charging controller 34 may switch the system main relay R1 to the connected state while keeping the disconnected state of the charging relay R2. With such switching, it is possible to avoid the interruption of the electric power supply to the power supply unit 25, in a case with the use of the power supply unit 25 after the system start-up before the travel while restoring the state of charge of the battery 11 by the non-contact charging.

Moreover, in the case where the non-contact charging transition switch 36 is operated and the non-contact charging processing is started, the charging controller 34 may determine the state of the charging relay R2. In the case with the charging relay R2 in the connected state, the charging controller 34 may promptly start the non-contact charging. With such a control, it is possible to start the non-contact charging while avoiding a temporary stop of the power supply unit 25, with the effective utilization of the switching of the charging relay R2 to the connected state at the system start-up.

Furthermore, according to the vehicle 1 of this embodiment, in the case with the charging relay R2 switched to the connected state in the system start-up processing, the vehicle controller 15 may determine the presence or the absence of the command to turn on the servo (step S6). The command to turn on the servo causes diminution of the possibility of the start of the non-contact charging. In the case with the presence of this command, the vehicle controller 15 may switch the charging relay R2 to the disconnected state through the charging controller 34 (step S11). With such a control, it is possible to prevent the high voltage of the battery 11 from being outputted to the rectifier 32 and the power receiving coil 31 on the travel of the vehicle 1, in the case where the vehicle 1 travels without the non-contact charging.

In addition, according to the vehicle 1 of this embodiment, in the case where the charging relay R2 is switched to the connected state at the system start-up (step S2), and thereafter, switched to the disconnected state (step S11), the vehicle controller 15 may perform the delay processing (step S12), and thereafter, start up the inverter 12 (step S13). Hence, it is possible to prevent the vehicle 1 from becoming able to travel, with the high voltage of the battery 11 remaining in the rectifier 32 and the power receiving coil 31.

Furthermore, according to the vehicle 1 of this embodiment, in the case where the charging relay R2 is switched to the connected state at the system start-up (step S2), and thereafter, switched to the disconnected state (step S11), the vehicle controller 15 may put the limitation on the driving power of the vehicle 1 for the predetermined period (steps S14 to S16). Hence, it is possible to prevent great torque from being outputted to the drive wheel of the vehicle 1 until the discharging of the rectifier 32 and the power receiving coil 31 is sufficiently carried out.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing embodiments, description is given that the charging controller 34 and the vehicle controller 15 cooperate with each other to execute the system start-up processing. However, the system start-up processing may be executed by the vehicle controller 15 or the charging controller 34, or any other controller. That is, in the forgoing embodiments, a "controller" of the technology is exemplified by the charging controller 34 and a "vehicle controller" of the technology is exemplified by the vehicle controller 15 in FIG. 1. However, the "controller" and the "vehicle controller" may each be exemplified by other controllers in a plurality, or alternatively, the "controller" and the "vehicle controller" may be exemplified by a single unified controller. In addition, the details described in the forgoing embodiment may be appropriately changed insofar as the changes fall within a range not departing from the scope of the technology.

At a system start-up, if a power receiving coil is in position to be available for electric power reception, it is assumed that charging is performed before travel. Moreover, at a start of the charging, it is assumed that electric power supply is being performed from a power supply unit to an electric device. Meanwhile, if the power receiving coil is out of position to be available for the electric power reception, no charging is performed before the travel. According to the aspect of the technology, a controller is configured to change, at the system start-up, a switching procedure of a first relay and a second relay, in accordance with whether or not the power receiving coil is in position to be available for the electric power reception from a power transmitting coil of ground facilities. This makes it possible to provide switching of the first relay and the second relay suitable for both of the forgoing two situations. Hence, it is possible to suppress impairment of convenience, e.g., interruption of the electric power supply of a power supply unit, in a case where the charging of a battery is started while the power supply unit is in use after the system start-up before the travel.

It is to be noted that the term "to change a switching procedure" as used in this specification is a concept including changing a target of switching, changing contents of switching, or changing an order of switching, or any combination thereof.

The charging controller 34 and the vehicle controller 15 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the charging controller 34 and the vehicle controller 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the charging controller 34 and the vehicle controller 15 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle, comprising:
   a battery configured to accumulate electric power for travel of the vehicle;
   an electric power acquirer that includes a power receiving coil and is configured to acquire electric power non-contact through the power receiving coil;
   a power supply unit able to provide a power supply from the battery to a device other than a traveling motor;
   a first relay configured to connect the battery to a power supply line or to disconnect the battery from the power supply line;
   a second relay configured to connect the electric power acquirer to the power supply line or to disconnect the electric power acquirer from the power supply line;
   a controller configured to perform a switching control of the first relay and the second relay;
   a vehicle controller configured to perform a travel control of the vehicle; and
   a first determination unit configured to make a determination, at a system start-up, as to whether or not the power receiving coil is in position to be available for electric power reception from a power transmitting coil of ground facilities,
   the controller being configured to change, at the system start-up, a switching procedure of the first relay and the second relay on a basis of a result of the determination of the first determination unit,
      wherein on a condition that the second relay is switched to the connected state at the system start-up and afterwards the second relay is switched to the disconnected state on a basis of a command to make a transition to a traveling mode, the vehicle controller delays the transition to the traveling mode.

2. The vehicle according to claim 1, wherein at the system start-up, the controller
   switches the first relay to a connected state after bringing the second relay to a connected state on a condition that the first determination unit determines that the power receiving coil is in position to be available for the electric power reception, and
   switches the first relay to the connected state, with a disconnected state of the second relay unswitched, on a condition that the first determination unit determines that the power receiving coil is out of position to be available for the electric power reception.

3. The vehicle according to claim 1, wherein at a start of non-contact charging of the battery, the controller
   determines a state of the second relay, and
   starts the non-contact charging without switching the second relay on a condition that the second relay is in a connected state.

4. The vehicle according to claim 2, wherein at a start of non-contact charging of the battery, the controller
   determines a state of the second relay, and
   starts the non-contact charging without switching the second relay on a condition that the second relay is in a connected state.

5. The vehicle according to claim 1, further comprising a second determination unit configured to determine reduction of a potential of a start of non-contact charging of the battery after the system start-up,
wherein the controller switches the second relay to a disconnected state on a condition that the second determination unit determines the diminution of the possibility.

6. The vehicle according to claim 2, further comprising a second determination unit configured to determine reduction of a potential of a start of non-contact charging of the battery after the system start-up,
wherein the controller switches the second relay to a disconnected state on a condition that the second determination unit determines the diminution of the possibility.

7. The vehicle according to claim 5, wherein on the condition that the second relay is switched to the connected state at the system start-up and afterwards the second relay is switched to the disconnected state on the basis of a command to make the transition to a traveling mode, the vehicle controller puts limitation on driving power for the travel of the vehicle, for a period after the second relay is switched to the disconnected state.

8. The vehicle according to claim 1, wherein on the condition that the second relay is switched to the connected state at the system start-up and afterwards the second relay is switched to the disconnected state on the basis of the command to make the transition to the traveling mode, the vehicle controller puts limitation on driving power for the travel of the vehicle, for a period after the second relay is switched to the disconnected state.

9. The vehicle according to claim 1, further comprising a charging transition processor configured to make alignment of the power receiving coil to bring the power receiving coil in position to be available for the electric power reception from the power transmitting coil,
wherein the controller includes an alignment completion storage configured to hold data regarding completion of the alignment of the power receiving coil by the charging transition processor, and
the first determination unit makes the determination, at the system start-up, as to whether or not the power receiving coil is in position to be available for the electric power reception, on a basis of the data held by the alignment completion storage and on a basis of travel history data.

10. The vehicle according to claim 2, further comprising a charging transition processor configured to make alignment of the power receiving coil to bring the power receiving coil in position to be available for the electric power reception from the power transmitting coil,
wherein the controller includes an alignment completion storage configured to hold data regarding completion of the alignment of the power receiving coil by the charging transition processor, and
the first determination unit makes the determination, at the system start-up, as to whether or not the power receiving coil is in position to be available for the electric power reception, on a basis of the data held by the alignment completion storage and on a basis of travel history data.

11. A vehicle, comprising:
a battery configured to accumulate electric power for travel of the vehicle;
an electric power acquirer that includes a power receiving coil and is configured to acquire electric power non-contact through the power receiving coil;
a power supply unit able to provide a power supply from the battery to a device other than a traveling motor;
a first relay configured to connect the battery to a power supply line or to disconnect the battery from the power supply line;
a second relay configured to connect the electric power acquirer to the power supply line or to disconnect the electric power acquirer from the power supply line; and
circuitry configured to
perform a switching control of the first relay and the second relay,
perform a travel control of the vehicle,
make a determination, at a system start-up, as to whether or not the power receiving coil is in position to be available for electric power reception from a power transmitting coil of ground facilities, and
change, at the system start-up, a switching procedure of the first relay and the second relay on a basis of a result of the determination,
wherein on a condition that the second relay is switched to the connected state at the system start-up and afterwards the second relay is switched to the disconnected state on a basis of a command to make a transition to a traveling mode, the vehicle controller delays the transition to the traveling mode.

12. The vehicle according to claim 1, wherein the controller couples the battery and an electric power acquirer through the power supply line, without letting a current flow through both the first relay and the second relay excess above a predetermined level.

13. The vehicle according to claim 11, wherein at the system start-up, the first relay switches to a connected state after bringing the second relay to a connected state on a condition that the first determination unit determines that the power receiving coil is in position to be available for the electric power reception, and
the first relay switches to the connected state, with a disconnected state of the second relay unswitched, on a condition that the first determination unit determines that the power receiving coil is out of position to be available for the electric power reception.

14. The vehicle according to claim 11, wherein at a start of non-contact charging of the battery, a state of the second relay is determined, and
the non-contact charging starts without switching the second relay on a condition that the second relay is in a connected state.

15. A vehicle, comprising:
a battery configured to accumulate electric power for travel of the vehicle;
an electric power acquirer that includes a power receiving coil and is configured to acquire electric power non-contact through the power receiving coil;
a power supply providing a power supply from the battery to a device other than a traveling motor;
a first relay configured to connect the battery to a power supply line or to disconnect the battery from the power supply line;
a second relay configured to connect the electric power acquirer to the power supply line or to disconnect the electric power acquirer from the power supply line;
a controller configured to perform a switching control of the first relay and the second relay;

a vehicle controller configured to perform a travel control of the vehicle, and wherein the controller is configured to make a determination, at a system start-up, as to whether or not the power receiving coil is in position to be available for electric power reception from a power transmitting coil of ground facilities, and wherein the controller being configured to change, at the system start-up, a switching procedure of the first relay and the second relay on a basis of a result of the determination of the controller, wherein on a condition that the second relay is switched to the connected state at the system start-up and the second relay is switched to the disconnected state on a basis of a command to make a transition to a first mode, the vehicle controller delays the transition to the first mode.

* * * * *